United States Patent

Sato et al.

[11] Patent Number: 5,848,422
[45] Date of Patent: *Dec. 8, 1998

[54] DATA MANAGEMENT DEVICE IN A KARAOKE COMMUNICATIONS SYSTEM

[75] Inventors: Masuhiro Sato; Kazuhiro Miyamoto; Mitsuyoshi Amano; Yoshiyuki Akiba; Makoto Takanashi; Sampei Asai, all of Tokyo-to, Japan

[73] Assignee: Pioneer Electronic Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 605,961

[22] Filed: Feb. 23, 1996

[30] Foreign Application Priority Data

Feb. 24, 1995 [JP] Japan ................... 7-062191

[51] Int. Cl.$^6$ ........................... G06F 17/30
[52] U.S. Cl. .............. 707/203; 707/203; 707/200; 707/201; 707/8; 395/712
[58] Field of Search .................. 395/619, 712, 395/500, 653; 434/307; 348/159, 12; 707/200, 203, 201, 8; 380/4, 20; 711/112; 379/71; 281/29

[56] References Cited

U.S. PATENT DOCUMENTS

| | | | |
|---|---|---|---|
| 5,247,126 | 9/1993 | Okamura et al. | 434/307 A |
| 5,473,772 | 12/1995 | Halliwell et al. | 395/650 |
| 5,484,291 | 1/1996 | Nakai | 348/159 |
| 5,528,490 | 6/1996 | Hill | 395/200 |
| 5,634,114 | 5/1997 | Shipley | 395/500 |

*Primary Examiner*—Paul R. Lintz
*Assistant Examiner*—Diane D. Mizrahi
*Attorney, Agent, or Firm*—Finnegan, Henderson, Farabow, Garrett & Dunner, L.L.P.

[57] ABSTRACT

A data management device in a karaoke system which receives a first data file by a receiving unit and is stored in a rewritable memory such as a hard disk. A second data file, recorded on a recording medium such as a CD-ROM, is read out by a reading unit. A file number comparing unit then compares the file numbers of the first and second data file and a file managing unit erases the first data file if the file numbers coincide with each other. In addition, a version comparing unit compares versions of both the first and second data file. If the first data file version is older than the second data file version, then the file managing unit erases the first data file version, so as to ensure that the new version is always used. Furthermore, a detecting unit detects whether data files corresponding to targeted items are recorded in both, the rewritable memory and the recording medium. In the event that data files are recorded in both, the file managing unit erases the data file in the rewritable memory.

14 Claims, 5 Drawing Sheets

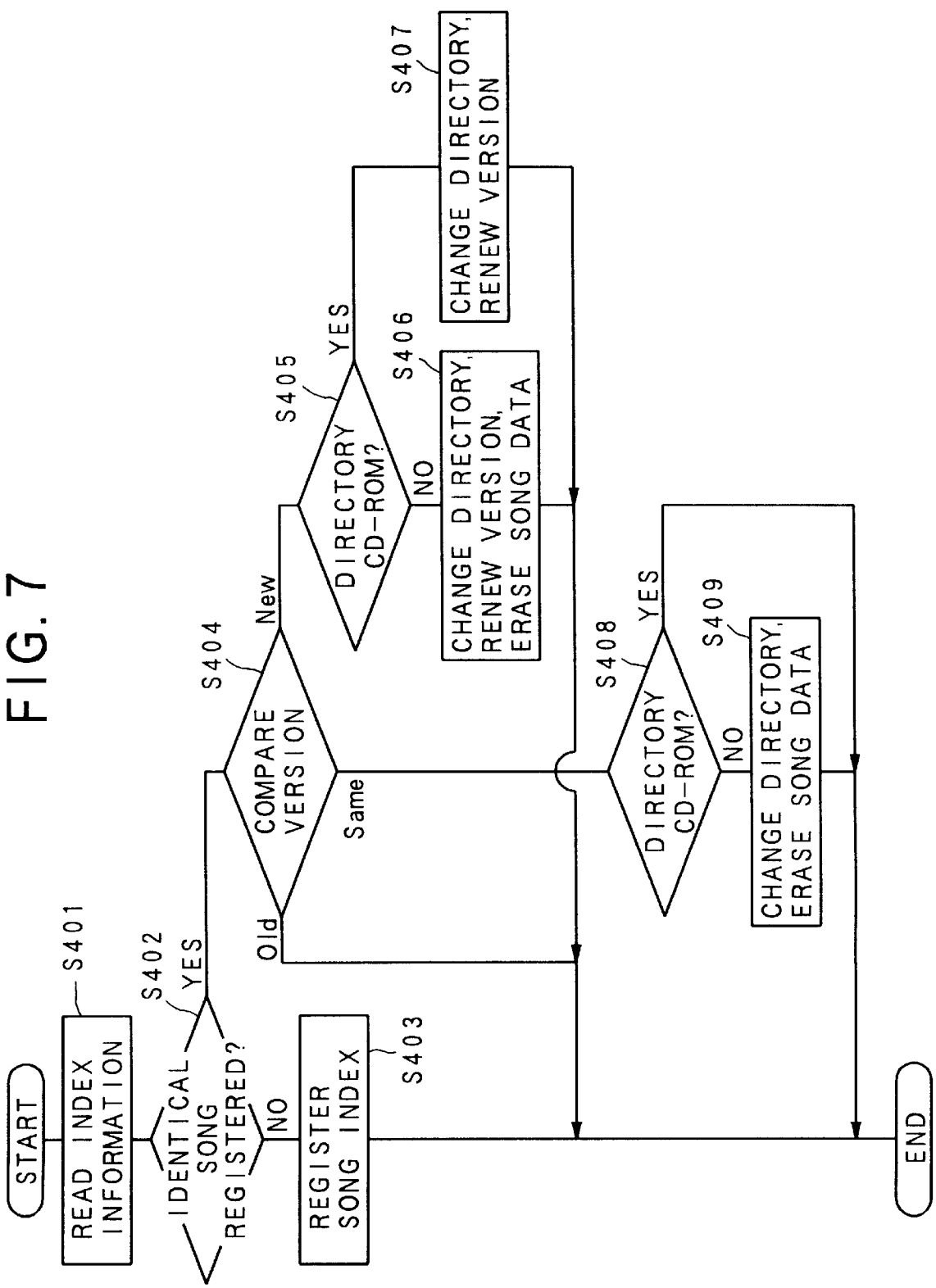

DATA MANAGEMENT DEVICE IN A KARAOKE COMMUNICATIONS SYSTEM

BACKGROUND OF THE INVENTION

1. Field of the Invention

The present invention relates to a data management device installed in a terminal device of a data supply system in which the terminal device receives a data supply from a supplier via a communication line and in a form of a recording medium. More particularly, this invention relates to a data management device for use in a communication karaoke system in which song data is supplied via both a public communication line and in a form of CD-ROM.

2. Description of the Prior Art

There is known a communication karaoke system in which a terminal device provided in a karaoke shop or user's house receives song data of karaoke songs via a public communication line such as a telephone line. In such a system, the terminal device includes a memory device for storing the song data supplied from a supplier. When a user requests a karaoke song, the terminal device first checks whether the requested song has already been stored in the memory device or not. If the requested song has been stored in the internal memory, the terminal device plays the song using a Musical Instrument Digital Interface (MIDI) formatted sound source or the like. On the other hand, if the requested song has not been stored in the internal memory device, the terminal device requests the center of the supplier to transmit the song data to the terminal device, and the terminal device plays the song using the song data thus supplied from the center.

In the communication karaoke system thus configured, it is necessary to supply the song data to the terminal device every time a song not being stored in the internal memory is requested, and hence the playback is delayed and the communication cost increases. In Japan, three new songs are released every day on average, and the internal memory of the terminal device generally having storage capacity for 2000 songs will become occupied in only two years. After that, the data transmission is required every time a new song is requested. If the old song data in the memory is erased or overwritten to store the new song data, the above problem may be overcome. However, it is impossible to increase the total number of the stored songs. As another countermeasure, the song data itself may be compressed to reduce the data quantity of a single song data. However, so doing makes the information insufficient, and the expression or feeling of the playback music is suffered. On the other hand, simply increasing the storage capacity of the memory results the increase of the cost.

SUMMARY OF THE INVENTION

It is an object of the present invention to provide a data management device capable of increasing the availability of song data while suppressing the increase of the communication cost and maintaining the unit data quantity of the supplied data.

According to one aspect of the present invention, there is provided a data management device that includes a receiving unit for receiving first data files transmitted by a data communication path. A rewritable memory then stores the first data files received by the receiving unit and reading unit subsequently reads out a second data file from the recording medium. A file number comparing unit then compares a file number of the first data file with a file number of the second data file, the file number identifying the contents of the data file. A file managing unit then erases the first data file corresponding to the file number if the file number of the first data file is coincident with the file number of the second data file.

In accordance with the device thus configured, the first data file is received by the receiving unit, and is stored in the rewritable memory such as a hard disk. In addition, the second data file recorded on the recording medium such as a CD-ROM is read out by the reading unit. The file number comparing unit compares the file numbers of the first data file and the second data file, and the file managing unit erases the first data file if the file numbers are coincident with each other. In this way, a new data file can be recorded on the rewritable memory in the area where the first data file is erased.

According to another aspect of the present invention, there is provided a data management device that includes a receiving unit for receiving first data files transmitted by a data communication path. A rewritable memory then stores the first data files received by the receiving unit and reading unit subsequently reads out a second data file from the recording medium. A file number comparing unit then compares a file number of the first data file with a file number of the second data file, the file number identifying the contents of the data file. A version comparing unit then compares a version of the first data file with a version of the second data file if the file number comparing unit detects that the file numbers of the first and the second data files are identical to each other. A file managing unit then erases the first data file and stores the data file of the newer version if the version of the first data file is older than that of the second data file.

In accordance with the device thus configured, the first data file is received by the receiving unit, and is stored in the rewritable memory such as a hard disk. In addition, the second data file recorded on the recording medium such as a CD-ROM is read out by the reading unit. The file number comparing unit compares the file numbers of the first data file and the second data file, and the version comparing unit compares the versions of the first data file and the second data file. The file managing unit erases the first data file if the version of the first data file is older than that of the second data file. In this way, a new data file can be recorded on the rewritable memory at the area where the first data file is erased, and the data file of the newer version may be always used.

According to still another aspect of the present invention, there is provided a data management device that includes a receiving unit for receiving data files corresponding to a plurality of items transmitted by a data communication path. A rewritable memory then stores the data files received by the receiving unit and reading unit for subsequently reading out a data file from the recording medium. A detecting unit then detects whether the data files corresponding to a target item are recorded in both of the rewritable memory and the recording medium. A a file managing unit then erases the data file in the rewritable memory when the detecting unit detects the data files corresponding to the target item in both of the rewritable memory and the recording medium.

In accordance with the device thus configured, the receiving unit receives data files corresponding to a plurality of items, and the rewritable memory stores the data files received by the receiving unit. The reading unit reads out the data file from the recording medium, and the detecting unit detects whether the data files corresponding to a target item are recorded in both of the rewritable memory and the recording medium. Then, the file managing unit erases the data file in the rewritable memory when the detecting unit detects the data files corresponding to the target item in both of the rewritable memory and the recording medium.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 7 is a flowchart illustrating a file management when a new song is supplied by a CD-ROM (with version management).

DETAILED DESCRIPTION OF THE PREFERRED EMBODIMENTS

The preferred embodiment of the present invention will be described below with reference to the attached drawings.

Figure 1:
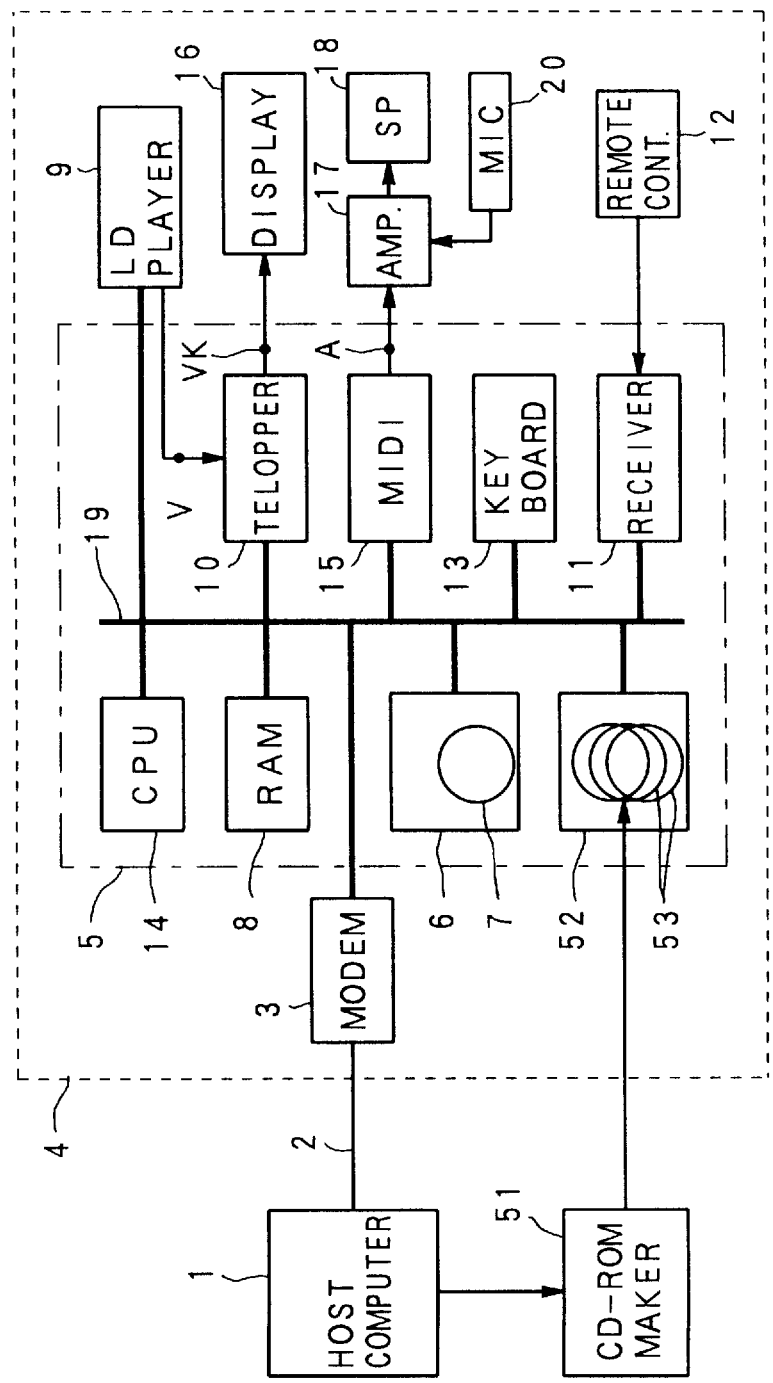
FIG. 1 is a block diagram illustrating a configuration of a communication karaoke system according to an embodiment of the present invention.

FIG. 1 illustrates a configuration of a communication karaoke system according to an embodiment of the present invention. The communication karaoke system is constituted by the communication center, the karaoke shop 4 and the CD-ROM maker 51. The host computer 1 provided at the center is connected to the CD-ROM maker 51 and is also connected to the karaoke shop 4 via the public communication line 2. The karaoke shop 4 includes the modem 3, the terminal device 5, the LD player 9, the remote controller 12, the display 16, the amplifier 17, the speaker 18 and the microphone 20. The terminal device 5 includes the harddisk drive 6 for accommodating the harddisk 7 serving as a rewritable memory, the RAM 8, the telopper 10, the receiver 11, the keyboard 13, the MIDI (Musical Instrument Digital Interface) sound source 15, the CPU 14 and the CD-ROM changer 52. The modem 3 is connected to the host computer 1 via the public communication line 2. The modem 3, the harddisk drive 6, the RAM 8, the LD player 9, the telopper 10, the receiver 11, the keyboard 13, the MIDI sound source 15 and the CD-ROM changer 52 are connected to the bus 19, and are controlled by the CPU 14. The telopper 10 is connected to the LD player 9 and the display 16. The MIDI sound source 15 is connected to the amplifier 17 which is connected to the speaker 18 and the microphone 20. The receiver 11 receives the instruction signal from the remote controller 12.

The host computer 1 stores the song data for a plurality of songs or tunes to be supplied to the karaoke shop 4. The song data includes accompaniment data for playing the accompaniment music according to the MIDI standard, the lyric data for generating lyric telop to be displayed, the background image data for providing the background image, as well as the index data relating to the song names and file names. The quantity of the song data differs between songs, and is normally about 200 k-bytes for one song when compressed by the reversible compression technique. Accordingly, it takes several ten seconds to transmit the song data of a single song via the general telephone line. The harddisk 7 has a storage capacity about 540 M-bytes, and can store and handle the song data for about 2000 songs or tunes in the form of data file.

The CD-ROM maker 51 makes the CD-ROMs 53 which are suitably supplied to the karaoke shop 4 and are set in the CD-ROM changer 52. The CD-ROM maker 51 properly obtains the song data and other necessary data for the making of the CD-ROM 53 from the host computer 1. A single CD-ROM 53 has a storage capacity of about 540 M-bytes, and hence has an ability to store the song data for about 2000 songs or tunes. In case the CD-ROM changer 52 can accommodate six CD-ROMs 53, a single terminal device can store the song data for about 14000 songs or tunes in total using the six CD-ROMs 53 and the harddisk 7. This storage capacity is normally sufficient, however, the number of the CD-ROMs may of course be changed according to needs.

In the karaoke shop 4, the LD player 9 serving as a video source is connected to the bus 19, and the video signal V outputted by the LD player 9 is supplied to the telopper 10. The video signal VK outputted by the telopper 10 is supplied to the display 16 and is displayed on the screen thereof. The accompaniment signal A from the MIDI sound source 15 and the voice signal from the microphone 20 are added to each other and then amplified by the amplifier 17, and the amplified audio signal is supplied to the speaker 18. The keyboard 13 allows a user to input necessary instruction and information. The CD-ROM changer 52 accommodates a plurality of CD-ROMs, e.g., six, on which song data serving as a second data file is recorded.

When a user makes a request of a song using the remote controller 12 or the keyboard 13, the CPU 14 gives an instruction to the harddisk drive 6 to search for the song data of the requested song in the harddisk 7. If the song data of the requested song is found, the CPU reads it out and temporarily stores it in the RAM 8. By referring to the song data, the MIDI sound source 15 generates the accompaniment signal A, the LD player 9 generates the image signal V of the background image, and the telopper 10 generates the telop signal of the lyrics in synchronous with each other. In addition, the telopper 10 superimposes the telop signal of the lyrics on the image signal to output the image signal VK including lyrics. By this, the image with the lyrics is displayed on the screen of the display 16, and simultaneously the accompaniment music and the voice from the microphone 20 are outputted from the speaker 18. On the other hand, if the song data of the requested song is not found in the harddisk 7, the CPU 14 calls to the host computer 1 via the modem 3 and the public communication line 2 to ask for supplying the song data of the requested song. In response, the host computer 1 transmits the song data to the terminal device 5, and the song data thus transmitted is temporarily stored in the RAM 8. Thereafter, the requested song is reproduced. In addition, the song data temporarily stored in the RAM 8 is supplied to and stored in the harddisk 7 if the harddisk 7 has unoccupied area.

In the above description, the song data of new songs are supplied to the karaoke device 4 every time the user requests the new song, and the song data thus supplied is stored in the harddisk 7. Namely, the center supplies the song data of only requested songs to the karaoke shop. However, the system may be so designed that song data of all new songs are supplied to the karaoke shop when they are released. In the following description, it is assumed that the new songs are supplied to the karaoke shop in this manner. Namely, when new songs are released, the song data of all new songs are supplied to the karaoke shop 4 irrespective of the request for the new song being made or not. In the center, the host computer 1 remembers the total number of the songs whose song data has been supplied to the terminal device 5, and when the total number reaches a predetermined number, e.g., 2000, the CD-ROM maker 51 makes a new CD-ROM 53 for the new songs already supplied to the terminal device 5 using the song data obtained from the host computer 1. Then, the CD-ROM maker 53 distributes the CD-ROM 53 thus made to the karaoke shop 4. The management of the total number is performed for each of the terminal devices 5, independently. Generally, making the CD-ROM 53 takes some days, however, since the new songs included in the CD-ROM 53 have already been supplied to the karaoke shop 5 via the public communication line 2, the delay of the CD-ROM distribution results no serious problem. When the new CD-ROM 53 thus obtained is set in the CD-ROM changer 52, the CPU 14 issues an instruction to read out the index information therefrom, and performs the file management of the song data in the harddisk 7 and the CD-ROM 53 in the manner described below.

Figure 2:
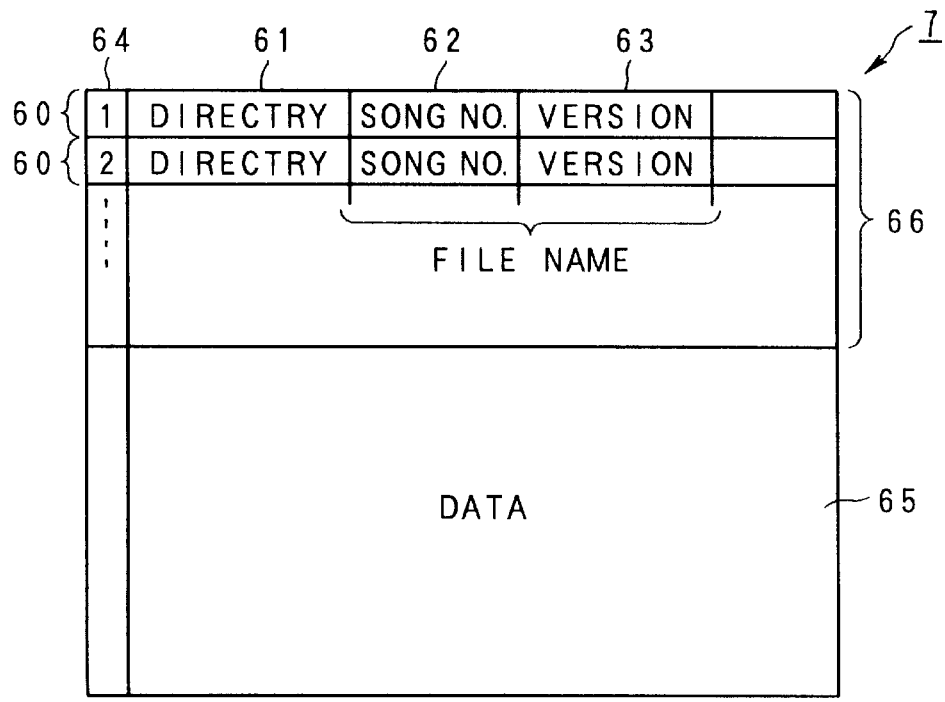
FIG. 2 is a diagram illustrating a memory configuration of the harddisk.

Now, the file management of the song data will be described. FIG. 2 illustrates a memory configuration of the harddisk 7. As shown, the harddisk 7 includes the index part 66 and the data part 65. The CPU 14 performs the file management using the index part 66. The index part 66 stores the song files 60 for the predetermined number of songs (e.g., 100 thousands) in a manner being applied successive file numbers 64, regardless of the number of the song data actually registered. Each of the song files 60 includes the file number 64, the directory 61, the song number 62 and the version number 63. The file number 64 identifies the song file 60, and the song number 62 identifies the song, i.e., the title of the song. The directory 61 is information indicative of the recording medium and the exact position on which the song data is recorded. Namely, the directory 61 stores recording medium information representing the recording medium, i.e., one of the harddisk 7 and the plural CD-ROMs 53, on which the song data is being stored, and the recording position information representing the exact recording position in the data part of the recording medium where the song data is recorded. The song number 62 identifies the song. The version number 63 is information indicative of one of the plural versions of the song data with respect to identical song identified by the same song number 62. The song data of the new version is applied a new version number 62. Every time the song data of new version is supplied from the host computer 1, the new version number 63 is stored. The version number 63 may be omitted if the version management is unnecessary. The file names of the song files are prescribed using only the song number 62 when the version management is unnecessary, and are prescribed using both the song number 62 and the version 63 when the version management is necessary. The song file 60 further includes character data representative of the song name, the genre of the song and the times of the playback in the past (not shown). In the data part 65, the song data is recorded at the position designated by the directory 61 of the song file 60. Namely, the song data whose recording medium information in the directory 61 represents the harddisk 7 is recorded at the position specified by the recording position information in the directory 61.

Figure 3:
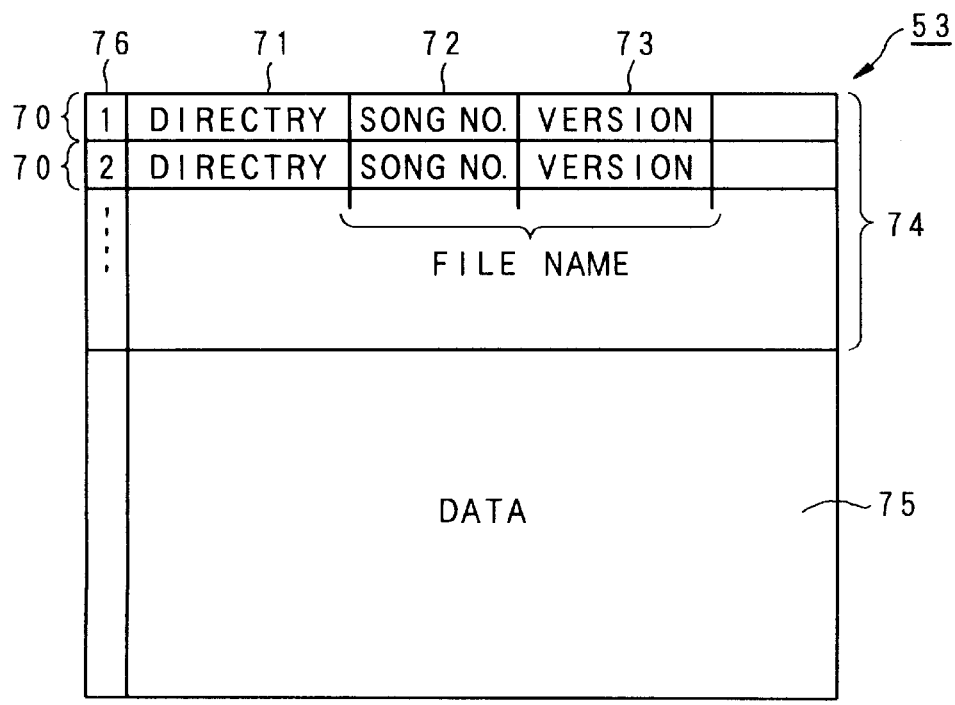
FIG. 3 is a diagram illustrating a memory configuration of the CD-ROM.

FIG. 3 illustrates a memory configuration of the CD-ROM 53 which includes the index part 74 and the data part 75 in the similar manner to the harddisk 7. Namely, the index part 74 includes song files 70 for a plurality of songs recorded in the CD-ROM 53. The song file 70 includes the directory 71, the song number 72, the version number 73 and other data. The data part 75 records the song data listed in the index part 74. It is noted that the recording medium information of the directory 71 represents only the CD-ROM 53, and the recording position information of the directory 61 represents the position in the data part 75 of the CD-ROM 53 itself.

Next, the file management at the time of supplying the song data to the terminal will be described with reference to FIGS. 4 to 7. In the following description, the operations of the cases in which the version management is performed and not performed are separately explained.

(1) Supplying song data via the public communication line (without version management)

Figure 4:
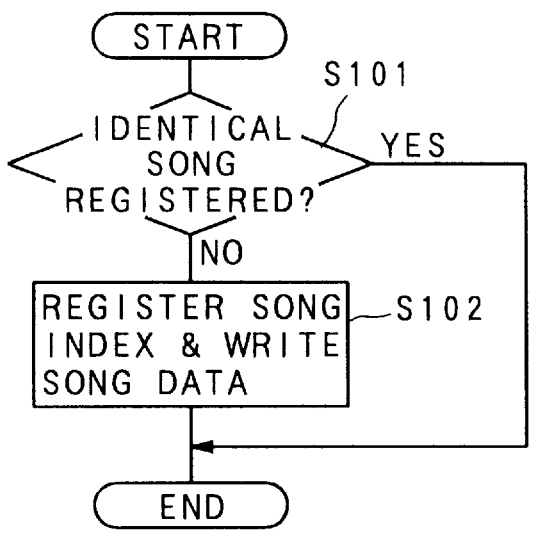
FIG. 4 is a flowchart illustrating a file management when a new song is supplied via a public communication line (with no version management)

Referring to FIG. 4, when the song data of a newly released song is supplied to the terminal device 5 via the public communication line 2, the CPU 14 judges whether the song data whose song number is identical to that of the newly supplied song data is stored in the index part 66 or not (step S101). If the identical song data is found in the index part 66 of the harddisk 7 (step S101:Yes), then the CPU 14 decides that it is unnecessary to register the song and does nothing. On the other hand, if the identical song data is not found (step S101:No), then the CPU 14 registers the index information of the song data in the index part 66 as a new song file 60. In this case, in the new song file 60, the recording medium information of the directory 61 represents the harddisk 7, and the song data is stored in the data part 65 of the harddisk 7 at the position specified by the recording position information of the directory 61 thus determined (step S102). Thus, the process ends. In this way, the song data of the new song is supplied to the terminal device 5 via the pubic communication line 2 and is stored in the harddisk 7, if the identical song data has not already been stored in the harddisk 7.

(2) Supplying song data by the CD-ROM (without version management)

Figure 5:
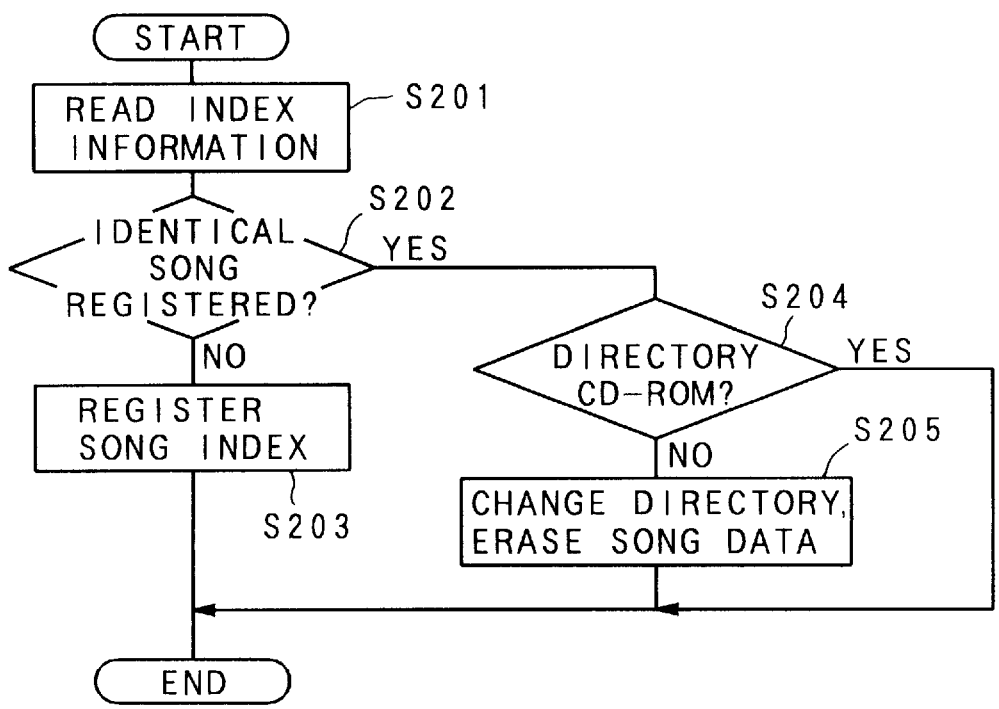
FIG. 5 is a flowchart illustrating a file management when a new song is supplied by a CD-ROM (with no version management)

Referring to FIG. 5, when a new CD-ROM 53 is distributed to the karaoke shop 4, the CPU 14 reads out the index part 74 of the CD-ROM 53 to obtain the index data of the songs recorded on the CD-ROM 53 (step S201). Then, the CPU 14 judges whether the song identical to the new song in the CD-ROM 53 is registered in the index part 66 of the harddisk 7 or not, by comparing the song numbers 62 and 72 (step S202). If the identical song is not registered (step S202:NO), the CPU 14 registers the index data of the song in the index part 66 (step S203), and the process ends. In this registration, the recording medium information of the directory 61 represents the CD-ROM 53 newly distributed. On the other hand, if the identical song is registered (step S202:Yes), then the CPU 14 checks whether the recording medium information of the directory 61 represents the CD-ROM 53 or not (step S204). If the recording medium information of the directory 61 represents the CD-ROM 53 (step S204:Yes), it means that the same song data has already been stored in another CD-ROM, and the CPU 14 does nothing. If the recording medium information of the directory 61 represents the harddisk 7, the CPU 14 changes the recording medium information of the directory 61 to the CD-ROM 53 newly supplied and registers the recorded position of the song data on the CD-ROM 53 in the directory 61 as the recording position information (step S205). In addition, the CPU 14 erases the song data recorded in the data part 65 of the harddisk 7, so that much of the newly supplied song can be stored before the distribution. The word "erase" includes the meaning of deleting the recorded data and invalidating the recorded data to enable the recording of the new data on the area. Namely, the recording area of the data part 65 is made recordable again. Thus, the process ends. In this way, when the new CD-ROM 53 is supplied and the new songs in the CD-ROM 53 are already stored in the harddisk 7, data in the index part 66 of the harddisk 7 is so changed that the directory 61 of the songs are directed to the newly supplied CD-ROM 53. Thereafter, when the song is requested, the song data is read out from the new CD-ROM 53 in accordance with the directory 61 thus changed.

(3) Supplying song data via the public communication line (with version management)

Figure 6:
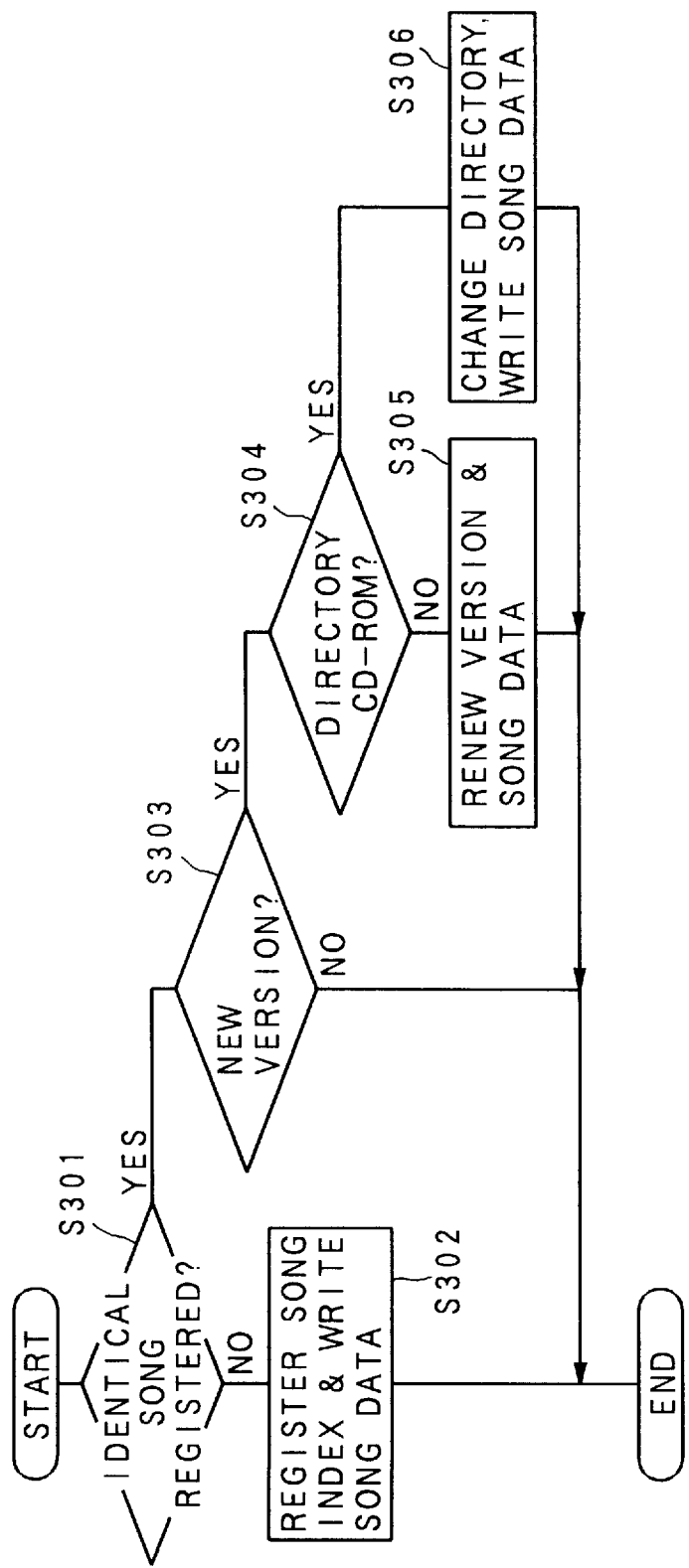
FIG. 6 is a flowchart illustrating a file management when a new song is supplied via a public communication line (with version management)

Referring to FIG. 6, when a new song is released and is supplied to the terminal 5, the CPU 14 judges whether the new song transmitted from the host computer 1 is registered in the index part 66 of the harddisk 7 or not (step S301). If step S301 results in No, the index information of the new song is registered in the index part 66 of the harddisk 7 as a new song file 60. In this case, in the new song file 60, the recording medium information of the directory 61 represents the harddisk 7, and the song data is stored in the data part 65 of the harddisk 7 at the position specified by the recording position information of the directory 61 thus determined (step S302).

If the step S301 result in Yes, then the CPU 14 compares the version of the transmitted song data with the version of the registered song data (step S303). If the version of the transmitted data is not newer than that of the registered one (step S303:No), the process ends. If the version of the transmitted data is newer than that of the registered one (step S303:Yes), then the CPU 14 checks the recording medium information of the directory 61 of the registered song data (step S304). If the recording medium information of the registered song data is directed to the harddisk (step S305:No), the CPU 14 renews the version data 63 of the registered song data to coincide with the version of the transmitted song data, and also replaces the song data recorded in the data part 65 with the new song data. Namely, since the song data of the old version has been recorded in the data part 65 of the harddisk 7, it is to be replaced with the song data of the new version by overwriting or the like. On the other hand, if the step S304 results in Yes, then the CPU 14 changes the recording medium information of the directory 61 from the CD-ROM to the harddisk 7, and stores the new song data transmitted in the data part 65 (step S306). Thus, the process ends. In this way, when the song data of new version is supplied via the public communication line 2, the index information of the song is changed and the song data of the new version is stored in the harddisk 7.

(4) Supplying song data by the CD-ROM (with version management)

Referring to FIG. 7, when a new CD-ROM 53 is distributed to the karaoke shop 4, the CPU 14 reads out the index part 74 of the CD-ROM 53 to obtain the index information of the songs recorded on the CD-ROM 53 (step S401). Then, the CPU 14 judges whether the song identical to the new song in the CD-ROM 53 is registered in the index part 66 of the harddisk 7 or not, by comparing the song numbers 62 and 72 (step S402). If the identical song is not registered (step S402:NO), the CPU 14 registers the index information of the song in the index part 66 (step S403), and the process ends. In this registration, the recording medium information of the directory 61 represents the CD-ROM 53 newly distributed. If the step S402 results in Yes, then the CPU 14 compares the version of the newly supplied song with the version of the song registered in the index part 66 (step S404). If the version of the newly supplied song on the CD-ROM is older (step S404:Old), the process ends. If the version of the newly supplied song is newer (step S404:New), the CPU 14 checks the recording medium information of the directory 61 (step S405). If the recording medium information is directed to the harddisk 7 (step S405:No), the CPU 14 changes the recording medium information of the directory 61 from the harddisk 7 to the new CD-ROM, renews the version data 63 of the song and erases the song data in the data part 65 (step S406). If step S405 results in Yes, the CPU 14 changes the recording medium information of the directory 61 to the CD-ROM newly supplied and also renews the version data 63 of the song (step S407).

If the version of the song in the newly supplied CD-ROM 53 is the same as that of the registered song (step S404:Same), the CPU 14 checks the recording medium information of the directory 61 (step S408). If the recording medium information is directed to the CD-ROM (step S408:Yes), then the process ends. If step S408 results in No, then the CPU 14 changes the recording medium information of the directory 61 from the harddisk 7 to the newly supplied CD-ROM (step S409), and erases the old song data in the data part 65. Thus the process ends. In this way, when the new CD-ROM is distributed, the version of the song data is renewed and the recording medium information of the directory 61 in the index part 66 is changed to the newly distributed CD-ROM.

As described above, according to the present invention, the song data is managed in accordance with the song files in the index part 66 after being supplied to the karaoke shop via the public communication line or in the form of CD-ROM. When a user makes a request, the CPU 14 refers to the file number 64 of the index part 66, and reads out the song data from the harddisk 7 and the CD-ROM 53 in accordance with the contents of the song file 60. In the above description, a communication karaoke system is embodied. However, the present invention is applicable to other data files of various items which can be supplied to the user using the communication line and the recording medium, such as game software, computer software or various documents. In addition, as the communication means, the ISDN or the satellite communication may be used as well as the public communication line. Further, as the recording medium, optical disk of other type, magneto-optical disk, magnetic disk, magnetic tape or IC card may also be used. Although the harddisk is employed as the rewritable memory, a magneto-optical disk or a RAM may alternatively be used.

What is claimed is:

1. A data management device for managing data supplied from a data distributor via both a data communication path and a storage medium, comprising:

a receiving means for receiving first data file transmitted from the data distributor via the data communication path;

a rewritable memory for storing the first data file received by said receiving means;

a reading means for accommodating the storage medium on which second data files are recorded and for reading out the second data files from the storage medium distributed by the data distributor;

a file number comparing means for comparing a file number of the first data file with a file number of the second data file when new first data file is transmitted or when a new storage medium is set to the reading means, said file number identifying contents of the data file; and a file managing means for invalidating or erasing the first data file corresponding to the file number if the file number of the first data file is coincident with the file number of the second data file.

2. A data management device for managing data supplied from a data distributor via both a data communication path and a storage medium, comprising:

a receiving means for receiving first data file transmitted from the data distributor by the data communication path;

a rewritable memory for storing the first data file received by said receiving means;

a reading means for accommodating a storage medium on which second data files are recorded and for reading out the second data files from the storage medium distributed by the data distributor;

a file number comparing means for comparing a file number of the first data file with a file number of the second data file when new first data file is transmitted or when a new storage medium is set to the reading means, said file number identifying contents of the data file;

a version comparing means for comparing a version of the first data file with a version of the second data file if said file number comparing means detects that the file numbers of the first and the second data files are identical to each other; and a file managing means for invaliding or erasing the first data file if the version of the first data file is older than that of the second data file.

3. A device according to claim 2, wherein said file managing means reads out one of the first and the second data files having a newer version if said file number comparing means and said version comparing means detect the first data file and the second file having identical file numbers and different versions, and invalidates or erases the first data file if the first data file in the rewritable memory has the older version.

4. A device according to claim 2, wherein said file managing means reads out one of the first and the second data files having a newer version in response to a request for reading out a data file if there are a plurality of data files having identical file number.

5. A data management device for managing data supplied from a data distributor via both a data communication path and a storage medium, comprising:

a receiving means for receiving data file corresponding to a plurality of items transmitted from a data distributor by the data communication path;

a rewritable memory for storing the data file received by said receiving means;

a reading means for accommodating a storage medium on which the data files are recorded and for reading out the data files from the storage medium distributed by the data distributor;

a detecting means for detecting the data files, corresponding to the same item, recorded on both of the rewritable memory and the storage medium when new first data file is transmitted or when a new storage medium is set to the reading means; and a file managing means for invalidating or erasing the data files in the rewritable memory when said detecting means detects the data files corresponding to the same item in both of the rewritable memory and the storage medium.

6. A device according to claim 5, further comprising an index data memory for storing a storage unit data indicative of a storage unit of the data file for each of the items, said file managing means changing the storage unit data of the item from the rewritable memory to the storage medium when said detecting means detects the data files corresponding to the same item in both of the rewritable memory and the storage medium.

7. A device according to claim 6, wherein said index data memory stores a version data indicative of a version of the item for each of the items, said device further comprises a version comparing means for comparing the version of the data file recorded on the storage medium with the version of the data file corresponding to the same item and recorded on the rewritable memory, and said file managing means changes the version data to be coincident with the version of the data file recorded on the storage medium if the version comparing means detects that the version of the data file recorded on the storage medium is newer.

8. A data management method for managing data supplied from a data distributor via both a data communication path and a storage medium, comprising the steps of:

receiving first data file transmitted from the data distributor via the data communication path;

storing the received first data file into a rewritable memory;

reading out the second data files from the storage medium distributed by the data distributor by a reading unit which accommodates the storage medium on which second data files are recorded;

comparing a file number of the first data file with a file number of the second data file when new first data file is transmitted or when a new storage medium is set to the reading unit, said file number identifying contents of the data file; and invalidating or erasing the first data file corresponding to the file number if the file number of the first data file is coincident with the file number of the second data file.

9. A data management method for managing data supplied from a data distributor via both a data communication path and a storage medium, comprising the steps of:

receiving first data file transmitted from the data distributor by the data communication path;

storing the received first data file into a rewritable memory;

reading out the second data files from the storage medium distributed by the data distributor by a reading unit which accommodates the storage medium on which second data files are recorded;

comparing a file number of the first data file with a file number of the second data file when new first data file is transmitted or when a new storage medium is set to the reading unit, said file number identifying contents of the data file;

comparing a version of the first data file with a version of the second data file if it is detected that the file numbers of the first and the second data files are identical to each other; and invalidating or erasing the first data file if the version of the first data file is older than that of the second data file.

10. A method according to claim 9, wherein invalidating step reads out one of the first and the second data files having a newer version if the first data file and the second file having identical file numbers are different versions are detected, and invalidates or erases the first data file if the first data file in the rewritable memory has the older version.

11. A device according to claim 9, wherein said invalidating step reads out one of the first and the second data files having a newer version in response to a request for reading out a data file if there are a plurality of data files having identical file number.

12. A data management method for managing data supplied from a data distributor via both a data communication path and a storage medium, comprising the steps of:

receiving data file corresponding to a plurality of items transmitted from a data distributor by the data communication path;

storing the received data file into a rewritable memory;

reading out the second data files from the storage medium distributed by the data distributor by a reading unit which accommodates the storage medium on which second data files are recorded;

detecting the data files, corresponding to the same item, recorded on both of the rewritable memory and the storage medium when new first data file is transmitted or when a new storage medium is set to the reading unit; and invalidating or erasing the data files in the rewritable memory when the data files corresponding to the same item are detected in both of the rewritable memory and the storage medium.

13. A method according to claim 12, further comprising the step of storing a storage unit data indicative of a storage unit of the data file for each of the items, said invalidating step changing the storage unit data of the item from the rewritable memory to the storage medium when the data files corresponding to the same item are detected in both of the rewritable memory and the storage medium.

14. A method according to claim 13, further comprising the steps of storing a version data indicative of a version of the item for each of the items; and comparing the version of the data file recorded on the storage medium with the version of the data file recorded on the storage medium with the version of the data file corresponding to the same item and recorded on the rewritable memory, wherein said invalidating step changes the version data to be coincident with the version of the data file recorded on the storage medium if it is detected that the version of the data file recorded on the storage medium is newer.

* * * * *